(12) United States Patent
Schwartz

(10) Patent No.: US 7,543,870 B2
(45) Date of Patent: Jun. 9, 2009

(54) INSERT APPARATUS FOR A PREEXISTING CART

(76) Inventor: Frederick C. Schwartz, P.O. Box 457, Clinton, PA (US) 15026

( * ) Notice: Subject to any disclaimer, the term of this patent is extended or adjusted under 35 U.S.C. 154(b) by 105 days.

(21) Appl. No.: 11/007,413

(22) Filed: Dec. 8, 2004

(65) Prior Publication Data
US 2006/0119123 A1 Jun. 8, 2006

(51) Int. Cl.
*B62D 39/00* (2006.01)
(52) U.S. Cl. .................. 296/24.33; 296/32; 296/10; 296/26.04; 280/651; 220/9.2
(58) Field of Classification Search .............. 296/24.3, 296/24.33, 10, 11, 26.04, 181.7, 183.1, 32, 296/33, 37.6; 280/656, 491.1, 491.2, 47.26, 280/651, 652, 47.18, 47.13; 220/9.1, 9.2, 220/495.05, 495.06, 495, 495.68, 495.1, 220/495.11; 211/175, 85.24
See application file for complete search history.

(56) References Cited

U.S. PATENT DOCUMENTS

| | | | | |
|---|---|---|---|---|
| 1,060,353 | A * | 4/1913 | Moreland | 296/33 |
| 2,625,973 | A * | 1/1953 | Weldon et al. | 206/459.5 |
| 3,165,760 | A * | 1/1965 | Abajian | 5/97 |
| 3,218,090 | A * | 11/1965 | Herman | 280/47.26 |
| 3,418,005 | A * | 12/1968 | Allina | 280/47.26 |
| 3,583,748 | A * | 6/1971 | Arndt | 294/68.24 |
| 3,870,367 | A * | 3/1975 | O'Brien | 298/1 B |
| 3,924,280 | A * | 12/1975 | Vaiano | 5/98.1 |
| 4,335,897 | A | 6/1982 | Muller, Jr. | |
| 4,350,366 | A | 9/1982 | Helms | |
| 4,629,203 | A | 12/1986 | Ballard | |
| 4,740,008 | A | 4/1988 | Johnson | |
| 4,787,197 | A | 11/1988 | Schweigert | |
| 4,922,696 | A | 5/1990 | Burns et al. | |
| 5,070,687 | A | 12/1991 | Schweigert | |
| 5,080,442 | A | 1/1992 | Doering et al. | |
| 5,118,173 | A * | 6/1992 | Proctor et al. | 312/213 |
| D337,188 | S * | 7/1993 | Bonskowski | D34/1 |
| 5,249,842 | A | 10/1993 | Doering et al. | |
| 5,351,847 | A * | 10/1994 | Greenbaum | 220/9.1 |
| 5,374,095 | A * | 12/1994 | Ramseth | 296/32 |
| 5,406,777 | A | 4/1995 | Porto | |
| 5,480,180 | A * | 1/1996 | Fuller et al. | 280/491.1 |
| D370,326 | S | 5/1996 | Chapman et al. | |
| 5,544,781 | A * | 8/1996 | Mattesky | 220/9.4 |
| 5,692,761 | A | 12/1997 | Havlovitz | |
| 5,761,887 | A | 6/1998 | Hanson | |
| 5,769,449 | A * | 6/1998 | Keesee | 280/656 |
| 5,833,336 | A * | 11/1998 | Dean | 312/293.2 |
| 5,839,772 | A * | 11/1998 | Toole | 296/32 |
| 5,967,342 | A * | 10/1999 | Steffine | 211/85.24 |
| 6,082,574 | A * | 7/2000 | Johnson | 220/495.1 |
| 6,152,510 | A * | 11/2000 | Newsome | 296/10 |
| 6,179,306 | B1 | 1/2001 | Maxwell | |
| 6,213,532 | B1 * | 4/2001 | Dunyon | 296/32 |
| 6,318,808 | B1 | 11/2001 | Shayne | |

(Continued)

*Primary Examiner*—Jason S Morrow
(74) *Attorney, Agent, or Firm*—The Webb Law Firm

(57) ABSTRACT

An insert apparatus for a preexisting cart. The insert apparatus includes a support structure having a base portion and a containment portion with an inner area. The base portion operatively engages the preexisting cart. A retaining element is provided and in operative communication with the containment portion of the support structure. The retaining element retains a material within the inner area of the containment portion of the support structure.

17 Claims, 1 Drawing Sheet

U.S. PATENT DOCUMENTS

| | | | |
|---|---|---|---|
| 6,378,893 B1 * | 4/2002 | Jager | 280/656 |
| 6,536,846 B1 | 3/2003 | Felty | |
| 6,691,879 B1 * | 2/2004 | Alvarez | 211/175 |
| 6,705,338 B2 * | 3/2004 | Zheng | 135/126 |
| 6,874,797 B2 * | 4/2005 | Gardenour | 280/47.131 |
| 6,942,279 B1 * | 9/2005 | Hoover | 296/26.04 |
| 7,097,182 B1 * | 8/2006 | Liu | 280/42 |
| 2001/0050489 A1 * | 12/2001 | Felix et al. | 296/32 |
| 2002/0070517 A1 * | 6/2002 | Ramsey | 280/47.19 |
| 2003/0025301 A1 * | 2/2003 | Banuelos, III | 280/651 |
| 2007/0131682 A1 * | 6/2007 | Liu | 220/9.1 |

* cited by examiner

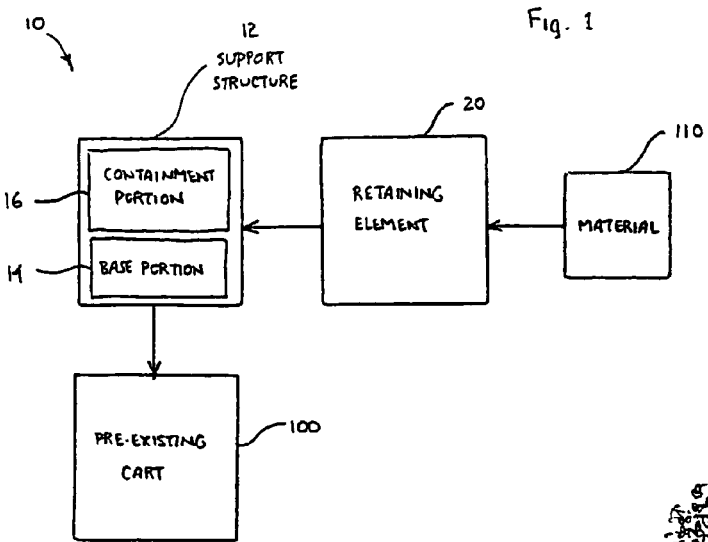
Fig. 1
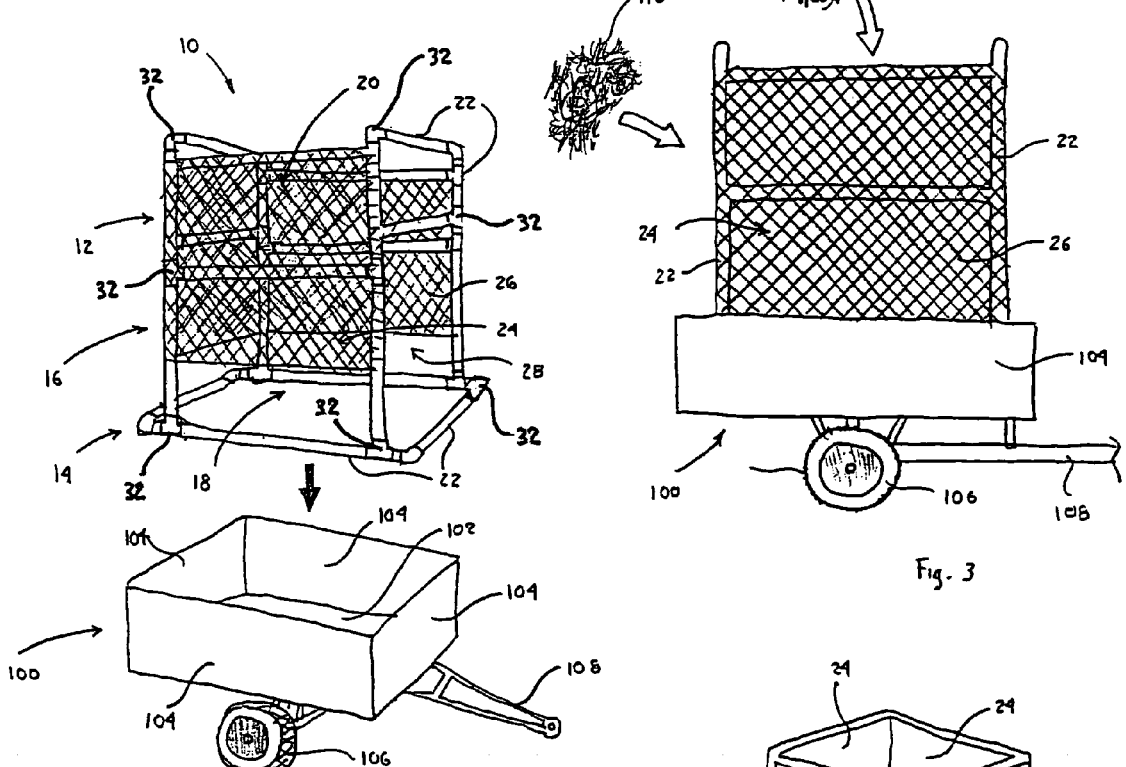
Fig. 2
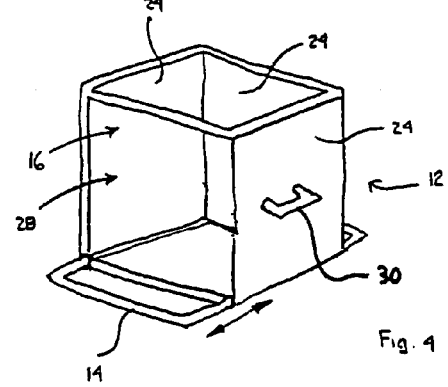
Fig. 3
Fig. 4

INSERT APPARATUS FOR A PREEXISTING CART

BACKGROUND OF THE INVENTION

1. Field of the Invention

The present invention relates generally to inserts and additions to preexisting carts and similar pullable vehicles, such as yard carts, pull carts, non-powered wheeled vehicles and the like and, in particular, to an insert apparatus for use in connection with a preexisting cart and for providing additional storage and transportation properties to the cart.

2. Description of Related Art

Presently, carts are used in a variety of applications for storing, temporarily containing and/or transporting objects and items between various locations. According to the prior art, yard carts and pull carts are available for attachment to a powered vehicle, such as a tractor, an all-terrain vehicle, a motorcycle and similar vehicles. These carts are used to store and transport items, while the user operates the powered vehicle. For example, yard carts are often used to temporarily store and transport grass clippings, leaves, mulch, soil, plants, trees and similar outdoor objects and items.

However, the user is severely limited to the amount of materials capable of being stored and transported in the cart, due to the structural limitations of these preexisting carts. Such prior art carts and wheelbarrows have been structurally modified to provide additional functionality and increased storage capacity. For example, see U.S. Pat. No. 4,335,897 to Muller, Jr.; U.S. Pat. No. 4,350,366 to Helms; U.S. Pat. No. 4,740,008 to Johnson; U.S. Pat. No. 5,406,777 to Porto; U.S. Pat. No. 5,692,761 to Havlovitz; U.S. Pat. No. 5,761,887 to Hanson; U.S. Pat. No. 6,179,306 to Maxwell; U.S. Pat. No. 6,318,808 to Shayne; and Des. 370,326 to Chapman et al. Prior art carts have also been modified to specifically add more volume to the cart for additional capacity and storage functions, by using attachable and modified structures. For example, see U.S. Pat. No. 4,629,203 to Ballard; U.S. Pat. No. 4,787,197 to Schweigert; U.S. Pat. No. 4,922,696 to Burns et al.; U.S. Pat. No. 5,070,687 to Schweigert; U.S. Pat. No. 5,080,442 to Doering et al.; U.S. Pat. No. 5,249,842 to Doering et al. and U.S. Pat. No. 6,536,846 to Felty.

While these modified carts, wheelbarrows, etc. provide for some extra storage capacity, the modified structures are complicated and constitute permanent cart modifications. The modifications are manufactured together with the cart, such that the cart is available to the consuming public as an integral structurally-combined cart. Accordingly, if the consumer desires this added functionality, he or she must purchase this modified cart. In addition, these prior art carts do not allow the user to revert back to a smaller, more-maneuverable version of the cart. None of the prior art carts or structural modifications offer an insert apparatus that can be easily engaged and disengaged with a preexisting cart, according to the user's desires.

SUMMARY OF THE INVENTION

It is, therefore, an object of the present invention to provide an insert apparatus for a preexisting cart that overcomes the deficiencies of the prior art. It is another object of the present invention to provide an insert apparatus for a preexisting yard cart. It is a further object of the present invention to provide an insert apparatus for a preexisting cart that provides additional storage capacity to the cart. It is yet another object of the present invention to provide an insert apparatus for a preexisting cart that is insertable or engageable with or within the cart, and which can subsequently be removed or disengaged from the cart. It is a still further object of the present invention to provide an insert apparatus for a preexisting cart that does not require complicated or integral modifications to the cart, and is easily assembled and disassembled.

Accordingly, the present invention is an insert apparatus for a preexisting cart. The insert apparatus includes a support structure having a base portion and a containment portion with an inner area. The base portion is capable of operatively engaging the preexisting cart. At least one retaining element is in operative communication with the containment portion of the support structure, and this retaining element retains a material within the inner area of the containment portion of the support structure.

The present invention is also directed to a kit for an insert apparatus for use in connection with a preexisting cart. The kit includes multiple connector elements arrangeable and attachable to create an upstanding support structure having a containment portion and a base portion. The base portion is sizable to operatively engage the cart. The kit also includes at least one retaining element attachable to the containment portion of the support structure for retaining a material within an inner area of the containment portion of the support structure.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 1 is a schematic view of an insert apparatus for a preexisting cart according to the present invention;

FIG. 2 is a perspective view of one embodiment of an insert apparatus for use in connection with a preexisting cart according to the present invention;

FIG. 3 is a side view of one embodiment of an insert apparatus for use in connection with a preexisting cart according to the present invention; and FIG. 4 is a perspective view of a further embodiment of an insert apparatus for use in connection with a preexisting cart according to the present invention.

DESCRIPTION OF THE PREFERRED EMBODIMENTS

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to an insert apparatus 10 for use in connection with a preexisting cart 100. Various views of various embodiments of such an insert apparatus 10 according to the present invention are illustrated in FIGS. 1-4. As is known in the art, the preexisting cart 100 includes a base surface 102 and multiple side walls 104, thereby creating a containment area within the cart 100. In addition, the cart 100 includes multiple wheels 106 (typically two), as well as a rig 108 extending therefrom. The rig 108 is used to connect to a powered vehicle (not shown), such as a tractor, an all-terrain vehicle, a motorcycle, etc. As is known in the art, this cart 100 may be a yard card, a pull cart, an attachable cart, a tractor cart, an all-terrain vehicle cart, a wagon, a transportable vehicle, a wheel vehicle, a portable structure, etc.

The insert apparatus 100 of the present invention may take many forms. In one preferred embodiment, the insert apparatus 100 includes a support structure 12 having a base portion 14 and a containment portion 16. The containment portion 16 includes an inner area 18. Further, the base portion 14 is configured or adapted to operatively engage the preexisting cart 100. Further, the insert apparatus includes one or more retaining elements 20 in operative communication with or attached to the containment portion 16 of the support structure 12. The retaining element 20 allows for material 110 to be placed within the inner area 18 of the containment portion 16 of the support structure 12. In addition, the retaining element 20 allows this material 110 to be stored or otherwise contained or retained in this inner area 18 during transportation.

In one embodiment, the support structure 12 includes multiple connector elements 22 that are arranged and attached to create an upstanding support structure 12. As seen in FIG. 2, the connector elements 22 may be tubes, pipes, arms, braces, longitudinally extending members, etc. These connector elements 22 may be removably or permanently attached to each other in a variety of manners as is known in the art. Still further, these connector elements 22 may be manufactured from multiple different materials, such as plastic, polymer, metals, semi-metals, synthetic materials, wood, etc.

In one preferred and non-limiting embodiment, the connector elements 22 are removably attached to each other. In this manner, the support structure 12 may be assembled and disassembled by a user. This has obvious benefits in allowing the user to disassemble and transport the insert apparatus 10 and, thereafter, assemble the insert apparatus 10 at a different location.

Also as seen in FIG. 2, the base portion 14 of the support structure 12 may be configured to rest upon the base surface 102 of the cart 100. In particular, the base portion 14 is sized and shaped so as to fit within and rest on the base surface 102 of the cart 100 in such a manner as it does not slide or tip while the cart 100 is in motion.

The retaining element 20 may be attached to a portion of the container portion 16 of the support structure 12. Such attachment creates a retaining wall 24 that assists in retaining the material 110 within the inner area 18 of the containment portion 16. In one preferred and non-limiting embodiment, and as seen in FIG. 2, the retaining element may be a netting material 26. In operation, the netting material 26 is stretched across a portion of the containment portion 16 of the support structure 12. The use of this lightweight netting material 26 provides appropriate retaining properties, while at the same time reducing the overall weight of the insert apparatus 10. When using the multiple connector elements 22, and as best seen in FIG. 3, the netting material 26 is stretched across and attached to at least two spaced connector elements 22, which creates a netting material retaining wall 24. This netting material 26 may be stretched across various spaced connector elements 22 in such a way as to create multiple retaining walls 24 around the support structure 12.

In order to facilitate the loading and unloading of material 110 in the insert apparatus 10, retaining element 20, such as the netting material 26, may be stretched across spaced connector elements 22 to create three netting material retaining walls 24 and one open side portion 28. It is this open side portion 28 that allows the user to insert and withdraw the material 110 to and from the inner area 18 of the container portion 16. Of course, when using the square-shaped containment portion 16, it is not necessary to include an open side portion 28, instead allowing the user to insert and withdraw the material 110 from the open top of the containment portion 16.

As with the support structure 12, the retaining element 20 may be manufactured from a variety of materials, other than a netting material 26 as discussed above. For example, the retaining element 20 may be manufactured from plastic, a polymer, a metal, a semi-metal, a synthetic material, wood, etc. For example, as seen in FIG. 4, the side walls or retaining walls 24 may be made from a solid material, such as a plastic material, which would prevent any of the inserted material 110 from penetrating the retaining wall and falling from the insert apparatus 10. In order to assist the user in manipulating the insert apparatus 10, the support structure 12 may also include one or more handles 30. In operation, the user may grasp the handle 30 and move the insert apparatus 10 to a desired location, place the insert apparatus 10 inside the cart 100, remove the insert apparatus 10 from the cart 100, etc.

It is envisioned that the support structure 12, the base portion 14, the containment portion 16, etc. may be adjustable by a user. For example, as seen in FIG. 4, the base portion 14 may be adjustable by a user, such that the insert apparatus 10 can be resized to operatively engage a variety of shaped and sized preexisting carts 100. For example, in the embodiment illustrated in FIG. 4, the user can simply slide the base portion 14 in and out in order to obtain the correct size. Therefore, when the user places the insert apparatus 10 in the cart 100, the base portion 14 of the support structure 12 would rest upon the base surface 102 and contact the side walls 104 of the cart 100. This would hold the insert apparatus 10 in place for transportation purposes.

As best seen in FIG. 2, when using connector elements 22 that are plastic tubing, the insert apparatus 10 may include one or more fitting elements 32. These fitting elements 32 will be used to connect the connector elements 22 together in a manner known in the art. For example, the fitting elements 32 may be typical pipe fittings, such as T-joints and elbows, which allow the user to easily assemble and disassemble the support structure 12. It is also envisioned that the fitting elements 32 may be nipples or other engageable elements, such that the user can join various fitting elements 32 and connector elements 22 together. In addition, the fitting elements 32 may be friction engagement members, so that the user may easily assemble and disassemble the support structure 12 without the use of any tools or considerable effort. For example, by reading simple instructions, the user can assemble the insert apparatus 10 by joining the various connector elements 22 together using the fitting elements 32, and further the fitting elements 32 may be attached together at various joints using T-joints, elbows, nipples to join the T-joints and elbows, etc. In addition, and like the connector elements 22, the fitting elements 32 are preferably made from a rigid and durable material so that the user can easily assemble and disassemble the support structure 12 multiple times for storage and transport functions. Further, variably sized connector elements 22 may be provided, such that the user can simply build the size and shape of support structure 12 that is desired for a particular application. It is also envisioned that the material 110 may be any transportable item. For example, the material 110 may be grass, grass clippings, leaves, mulch, dirt, soil, plants, trees, outdoor items, objects, items, clothes, materials, etc.

The present invention also provides for offering the insert apparatus 10 as a kit. The user would be provided with multiple connector elements 22 and fitting elements 32, such that the connector elements 22 can be arranged and attached to create the upstanding support structure 12. Further, the retaining elements 20 may be placed on the created containment portion 16, for example the netting material 26 may be wound around and attached to various connector elements 22 on the support structure 12. As discussed above, the use of multiple connector elements 22 allows the user to create the desired size and shape of support structure 12 for the specified application. In addition, the base portion 14 may be adjusted by the user to fit many different carts 100.

In this manner, the present invention provides an insert apparatus 10 that is particularly useful in connection with a preexisting cart 100. The insert apparatus 10 includes a support structure 12 that is easily insertable within and removable from the preexisting cart 100. In addition, an open side portion 28 may be provided to easily insert and remove material 110, such as grass clippings, leaves, etc. When the user does not need this extra storage and transportation space, he or she may simply remove the insert apparatus 10 from the cart 100, and use the cart 100 in the original application. The insert apparatus 10 is both lightweight and easy to manufacture and install.

This invention has been described with reference to the preferred embodiments. Obvious modifications and alterations will occur to others upon reading and understanding the preceding detailed description. It is intended that the invention be construed as including all such modifications and alterations.

The invention claimed is:

1. An insert apparatus for a preexisting cart having a base surface and side walls defining a containment area, comprising:
    a support structure having a base portion and a containment portion with an inner area, the base portion configured to operatively engage the preexisting cart, wherein the containment portion comprises a plurality of elongated vertically-extending connector elements having a length and a plurality of horizontally-extending connector elements arranged and attached to thereby create an upstanding support structure, and the base portion includes a plurality of elongated horizontally-extending connector elements configured for sliding engagement with one another such that the base portion is adjustable by a user, thereby allowing the insert apparatus to be re-sized to operatively engage a plurality of variably-sized preexisting carts; and
    at least one retaining element directly attached between at least two spaced elongated connector elements substantially along the length thereof, thereby creating at least one retaining wall configured to retain a material within the inner area of the containment portion of the support structure,
    wherein the base portion of the support structure is configured to rest upon the base surface and within the containment area of the preexisting cart, an open area configured to correspond to the confinement area of the preexisting cart is provided between the base portion and a bottom edge of the at least one retaining wall and at least a portion of the base portion of the support structure is configured to contact at least one of the side walls of the preexisting cart, thereby preventing the support structure from sliding or tipping while the cart is in motion.

2. The insert apparatus of claim 1, wherein the connector elements are at least one of tubes, pipes, arms, braces and longitudinally extending members.

3. The insert apparatus of claim 1, wherein the connector elements are manufactured from at least one of plastic, a polymer, metal, semi-metal, a synthetic material and wood.

4. The insert apparatus of claim 1, wherein the connector elements are removably attachable to each other, such that the support structure is capable of assembly and disassembly by a user.

5. The insert apparatus of claim 1, wherein the retaining element is a netting material.

6. The insert apparatus of claim 5, wherein the netting material is stretched across a portion of the containment portion of the support structure, thereby creating at least one retaining wall configured to retain the material within the inner area of the containment portion.

7. The insert apparatus of claim 5, wherein the support structure comprises a plurality of connector elements arranged and attached to thereby create an upstanding support structure, and wherein the netting material is stretched across at least two spaced connector elements, thereby creating at least one netting material retaining wall.

8. The insert apparatus of claim 5, wherein the support structure comprises a plurality of connector elements arranged and attached to thereby create an upstanding support structure having a plurality of support structure side portions, and wherein the netting material is stretched across a plurality of spaced connector elements, thereby creating a plurality of netting material retaining walls.

9. The insert apparatus of claim 5, wherein the support structure comprises a plurality of connector elements arranged and attached to thereby create an upstanding support structure having four support structure side portions, and wherein the netting material is stretched across a plurality of spaced connector elements, thereby creating a plurality of netting material retaining walls.

10. The insert apparatus of claim 9, wherein the netting material is stretched across a plurality of spaced elements, thereby creating three netting material retaining walls and one open side portion configured to permit the insertion and withdrawal of the material to and from the inner area of the support structure.

11. The insert apparatus of claim 1, wherein the retaining element is manufactured from at least one of plastic, a polymer, metal, semi-metal, a synthetic material and wood.

12. The insert apparatus of claim 1, wherein the support structure further comprises at least one handle configured to allow a user to grasp the handle and manipulate the insert apparatus.

13. The insert apparatus of claim 1, wherein at least one of the support structure, the base portion and the containment portion is slidingly adjustable by a user.

14. The insert apparatus of claim 1, wherein the support structure comprises a plurality of connector elements arranged and attached to thereby create an upstanding support structure, wherein the connector elements are attachable to each other via at least one fitting element.

15. The insert apparatus of claim 1, wherein the material is at least one of grass, grass clippings, leaves, mulch, dirt, soil, plants, trees, outdoor items, at least one object, at least one item, clothes and materials.

16. The insert apparatus of claim 1, wherein the preexisting cart is at least one of a yard cart, a pull cart, an attachable cart, a tractor cart, an all-terrain vehicle cart, a wagon, a transportable vehicle, a wheeled vehicle and a pullable structure.

17. A kit for an insert apparatus for use in connection with a preexisting cart having a base surface and side walls defining a containment area, the kit comprising:
- a plurality of elongated vertically-extending connector elements having a length and arrangeable and attachable to thereby create an upstanding support structure having a containment portion and a base portion; and
- at least one retaining element directly attachable between at least two spaced elongated connector elements substantially along the length thereof, thereby creating at least one retaining wall configured to retain a material within an inner area of the containment portion of the support structure,
- wherein the base portion of the upstanding support structure is configured to rest upon the base surface and within the containment area of the preexisting cart, the base portion comprising a plurality of elongated horizontally-extending connector elements configured for sliding engagement with one another such that the base portion is adjustable by a user, thereby allowing the insert apparatus to be re-sized to operatively engage a plurality of variably-sized preexisting carts,
- wherein an open area configured to correspond to the confinement area of the preexisting cart is provided between the base portion and a bottom edge of the at least one retaining wall and at least a portion of the base portion of the upstanding support structure is configured to contact at least one side wall of the preexisting cart.

* * * * *